(12) United States Patent
Chen

(10) Patent No.: US 10,175,719 B2
(45) Date of Patent: Jan. 8, 2019

(54) DISPLAY DEVICES AND THE FLATTING METHOD OF THE FLEXIBLE DISPLAY PANELS THEREOF

(71) Applicant: Wuhan China Star Optoelectronics Technology Co., Ltd., Wuhan, Hubei (CN)

(72) Inventor: Ji-feng Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 7 days.

(21) Appl. No.: 15/544,518

(22) PCT Filed: May 4, 2017

(86) PCT No.: PCT/CN2017/083089
§ 371 (c)(1),
(2) Date: Jul. 18, 2017

(87) PCT Pub. No.: WO2018/152970
PCT Pub. Date: Aug. 30, 2018

(65) Prior Publication Data
US 2018/0267571 A1    Sep. 20, 2018

(30) Foreign Application Priority Data

Feb. 23, 2017   (CN) .......................... 2017 1 0099845

(51) Int. Cl.
*G06F 1/16*    (2006.01)

(52) U.S. Cl.
CPC .......... *G06F 1/1618* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,577,496 | B1* | 6/2003 | Gioscia | G06F 1/1616 |
| | | | | 345/156 |
| 8,816,977 | B2* | 8/2014 | Rothkopf | G06F 1/1652 |
| | | | | 345/173 |
| 9,013,864 | B2* | 4/2015 | Griffin | H04M 1/0216 |
| | | | | 16/382 |
| 9,229,481 | B2* | 1/2016 | Jinbo | G06F 1/1652 |
| 9,348,362 | B2* | 5/2016 | Ko | G06F 1/1626 |

(Continued)

*Primary Examiner* — Lisa Lea Edmonds
(74) *Attorney, Agent, or Firm* — Andrew C. Cheng

(57) ABSTRACT

The present disclosure relates to display devices. The display device includes a flexible display panel, a folded housing carrying the flexible display panel, and a force sensing system configured in a bending area of the flexible display panel. The bending area of the flexible display panel is bent frequently. The force sensing system is configured for detecting a deformed state of the flexible display panel. The flexible display panel protrudes from the first wing portion and the second wing portion, and the flexible display panel connects to the first actuator and the second actuator. The first actuator and the second actuator are configured to apply traction forces to the first end portion and the second portion according to force information detected by the force sensing system, such that the flexible display panel being completely bonded on a surface of the folded housing.

8 Claims, 3 Drawing Sheets

(56) References Cited

U.S. PATENT DOCUMENTS

| | | | | |
|---|---|---|---|---|
| 9,541,962 B2* | 1/2017 | Siddiqui | .............. | G06F 1/1618 |
| 9,980,373 B2* | 5/2018 | Jeong | .................... | G05B 11/01 |
| 10,063,677 B2* | 8/2018 | Cavallaro | ........... | H04M 1/0268 |
| 10,074,824 B2* | 9/2018 | Han | ..................... | H01L 51/5237 |
| 2010/0164837 A1* | 7/2010 | Kao | ..................... | G06F 1/1616 |
| | | | | 345/1.3 |
| 2012/0127087 A1* | 5/2012 | Ma | ....................... | G06F 1/1616 |
| | | | | 345/173 |
| 2013/0010405 A1* | 1/2013 | Rothkopf | ............ | H04M 1/0216 |
| | | | | 361/679.01 |
| 2014/0126133 A1* | 5/2014 | Griffin | ................. | G06F 1/1616 |
| | | | | 361/679.27 |
| 2014/0355195 A1* | 12/2014 | Kee | ..................... | G06F 1/1616 |
| | | | | 361/679.27 |
| 2015/0378397 A1* | 12/2015 | Park | ..................... | G06F 1/1652 |
| | | | | 361/679.27 |
| 2016/0306427 A1* | 10/2016 | Modarres | ............. | G06F 3/0412 |
| 2017/0264888 A1* | 9/2017 | Valentine | .............. | H04N 13/31 |
| 2017/0272559 A1* | 9/2017 | Cavallaro | ........... | H04M 1/0268 |
| 2018/0018753 A1* | 1/2018 | McLaughlin | ......... | G06F 3/1446 |
| 2018/0040678 A1* | 2/2018 | Zhai | ....................... | G06F 3/045 |
| 2018/0203487 A1* | 7/2018 | Kee | ..................... | G06F 1/1616 |
| 2018/0224941 A1* | 8/2018 | Modarres | ............. | G06F 3/0412 |

* cited by examiner

DISPLAY DEVICES AND THE FLATTING METHOD OF THE FLEXIBLE DISPLAY PANELS THEREOF

BACKGROUND OF THE INVENTION

1. Field of the Invention

The present disclosure relates to liquid crystal display technology, and more particularly to a flexible display device.

2. Discussion of the Related Art

With the development of organic light emitting diode (OLED) display technology, the majority of consumers experience the great differences between the OLED display and the traditional LCD display, and thus the OLED consumer market is growing rapidly. Due to the self-luminous characteristics of the OLED flexible display, multi-layer organic plastic films are stacked together. The OLED flexible display is characterized by the attributes, such as bending, curling, short response time, high contrast, wide viewing angle, wide color gamut, light weight. As such, the OLED display panel can be bent, and thus the OLED display panel has been the mainstream in the industry.

However, the experimental results show that the flexible display may include crease while being flattened after being bent by a great curvature for a long time. That is, the surface of the flexible display can not immediately return to a fully flat level. The preliminary results are caused by the Creep phenomenon of the optical gel (OCA glue) inside the flexible display. So far, there is no solution to overcome the kind of issue.

SUMMARY

The present disclosure relates to a flexible display panel adopting a force sensing solution to solve the flatting issue after the flexible display panel is folded.

In one aspect, a display device includes: a flexible display panel, a folded housing carrying the flexible display panel, and a force sensing system configured in a bending area of the flexible display panel, the bending area of the flexible display panel being bent frequently, and the force sensing system being configured for detecting a deformed state of the flexible display panel; the folded housing includes a first wing portion, a second wing portion, a hinge component connecting between the first wing portion and the second wing portion, a first actuator and a second actuator arranged below the first wing portion and the second wing portion, and the first actuator and the second actuator are mirror-symmetrical; the flexible display panel protruding from the first wing portion and the second wing portion, and the flexible display panel connecting to the first actuator and the second actuator, the first actuator and the second actuator configured to apply traction forces to the first end portion and the second portion according to force information detected by the force sensing system, such that the flexible display panel being completely bonded on a surface of the folded housing.

Wherein the first wing portion, the second wing portion, and the hinge component are on the same plane, and the folded housing includes at least a flat state.

Wherein the force sensing system includes a force sensor and a controller, the controller respectively connects to the first actuator, the second actuator, and the force sensor; the controller drives the force sensor to detect and to receive the force information, and the controller calculates a value of the traction forces according to the force information to activate the first actuator and the second actuator, such that the flexible display panel being completely bonded on a surface of the folded housing.

Wherein the first wing portion and the second wing portion rotate with respect to the hinge component, and a diagonal angle formed by the first wing portion and the second wing portion is in a range from 0 to 360 degrees.

Wherein the first actuator includes a first actuator motor and a first elastic-pushing component connecting with the first actuator motor, the second actuator includes a second actuator motor and second first elastic-pushing component connecting with the second actuator motor, the first end portion and the second end portion respectively connects to free ends of the first elastic-pushing component and second elastic-pushing component.

Wherein the first end portion and the second end portion respectively connects to the free ends of the first elastic-pushing component and second elastic-pushing component via dual-sided adhesive.

Wherein the folded housing further includes a first bottom cover and a second bottom cover, the first bottom cover engages with the first wing portion to clasp the first actuator between the first bottom cover and the first wing portion, the second bottom cover engages with the second wing portion to clasp the second actuator between the second bottom cover and the second wing portion.

In another aspect, the method further includes: in step S1, activating the controller; in step S2, driving the force sensor by the controller to detect a force (F) applied to the flexible display panel, and receiving the force information feedback by the force sensor; in step S3, comparing the force indicated by the force information with a predetermined force value configured within the controller in advance; stopping operations of the controller upon determining that the detected force (F) is not greater than the predetermined force value (H) (F≤H); calculating a traction force value (F') for stretching the flexible display panel completely upon determining that the detected force (F) is greater than the predetermined force value (H) (F>H); in step S4, transmitting the traction force value (F') to the first actuator and the second actuator to activate the first actuator and the second actuator, and applying the traction force value (F') to the flexible display panel by the first actuator and the second actuator such that the flexible display panel being stretched completely.

In view of the above, the flexible display panel connects to a force sensing system. The optimal traction force value may be obtained by the force sensing system combined with mechanical structure. By applying the traction force value on the bent flexible display panel, the flexible display panel may be completely flat after being folded due to the controllable and precise traction force value.

DETAILED DESCRIPTION OF THE EMBODIMENTS

Figure 1:
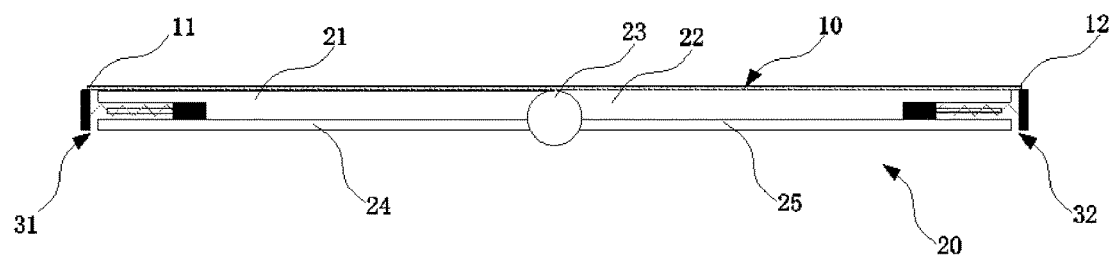
FIG. 1 is a schematic view of the display device in accordance with one embodiment of the present disclosure.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

As shown in FIG. 1, the display device includes a flexible display panel 10, a folded housing 20 carrying the flexible display panel 10, and a force sensing system. The folded housing 20 includes at least a first wing portion 21, a second wing portion 22, a hinge component 23 connecting between the first wing portion 21 and the second wing portion 22. The display device also includes a first actuator 31 and a second actuator 32 arranged below the first wing portion 21 and the second wing portion 22, and the first actuator 31 and the second actuator 32 are mirror-symmetrically.

In one embodiment, the flexible display panel is rectangular-shaped, that is, the flexible display panel includes two long sides opposite to each other, and two short sides opposite to each other. Due to the flexibility of the flexible display screen, the two short sides are overlapped to fold the flexible display, such that the size of the display screen is adjusted. In one embodiment, the two short sides are respectively defined as a first end portion 11 and a second end portion 12 respectively protruding from the first wing portion 21 and the second wing portion 22. In addition, the first end portion 11 and the second end portion 12 respectively connects to the first actuator 31 and the second actuator 32.

Figure 2:
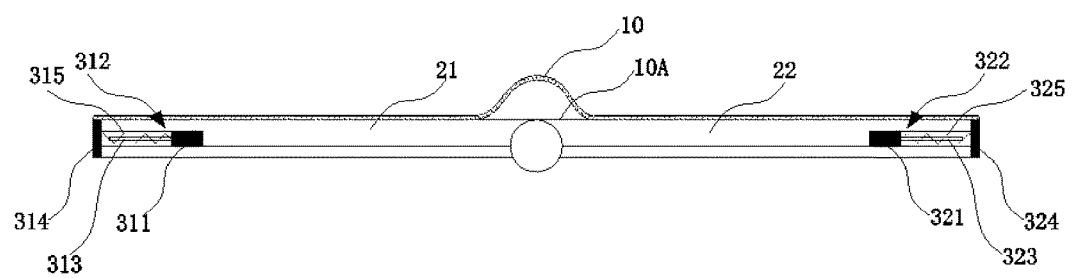
FIG. 2 is a schematic view of the display device of another structure in accordance with one embodiment of the present disclosure.
Figure 3:
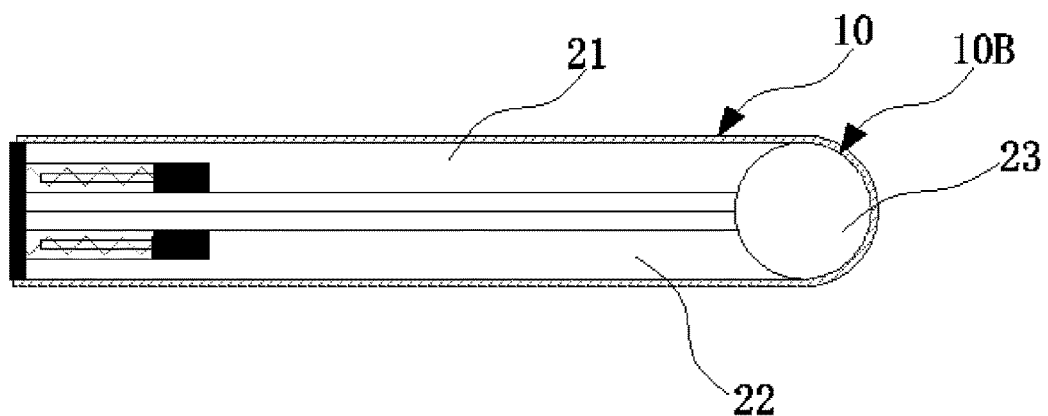
FIG. 3 is a schematic view of the display device of another structure in accordance with one embodiment of the present disclosure.

Referring to FIGS. 2 and 3, the first wing portion 21 and the second wing portion 22 may respectively rotate with respect to the hinge component 23 just like a pair of wings. The diagonal angle formed by the first wing portion 21 and the second wing portion 22 may be in a range from 0 to 360 degrees. When the diagonal angle θ formed by the first wing portion 21 and the second wing portion 22 equals to 180 degrees, the first wing portion 21, the second wing portion 22, and the hinge component 23 are on the same plane, that is, the folded housing 20 is in a flat state. The first wing portion 21, the second wing portion 22, and the hinge component 23 cooperatively define a flat carrier surface (10A). The flexible display panel may be bonded on the flat carrier surface (10A) flatly.

When the diagonal angle θ formed by the first wing portion 21 and the second wing portion 22 equals to 360 degrees, bottom surfaces of the first wing portion 21 and the second wing portion 22 face toward each other such that the first wing portion 21 and the second wing portion 22 are overlapped. The first wing portion 21, the second wing portion 22, and the hinge component 23 cooperatively form an U-shaped curved carrier surface (10B). At this moment, the folded housing 20 is in a folded state, and the flexible display panel 10 covers curved carrier surface (10B).

It can be understood that the first wing portion 21 and the second wing portion 22 may rotate by 360 degrees with respect to the hinge component 23, such that the folded housing 20 may be of other shapes.

As shown in FIGS. 1 and 2, the first actuator 31 and the second actuator 32 are respectively arranged below the first wing portion 21 and the second wing portion 22, and the first actuator 31 and the second actuator 32 are symmetrical to each other.

The actuators may be configured in a variety of ways. In one example, the first actuator 31 includes a first actuator motor 311 and a first elastic-pushing component 312 connecting with the first actuator motor 311. The first elastic-pushing component 312 includes a first pushing axis 313 connecting to the first actuator motor 311, a bottom connecting to the first end portion 11, and a first active portion 314 corresponding to the first pushing axis 313. The first active portion 314 connects to the first actuator motor 311 by a first coil spring 315 sheathing around the first pushing axis 313. The first actuator motor 311 is a stepping motor. When being driven by the first actuator motor 311, the first pushing axis 313 may reciprocate relative to a single shaft in a stepping manner. At the same time, the first coil spring 315 may be elastically deformed. As the first coil spring 315 pushes or pulls the first active portion 314, the first active portion 314 may move away for move close to the first end portion 11. The first active portion 314 sheathes around the first coil spring 315 so as to support and to guide the first coil spring 315.

Similarly, the second actuator 32 includes a second actuator motor 321 and a second elastic-pushing component 322 connecting to the second actuator motor 321. The second elastic-pushing component 322 includes a second pushing axis 323 connecting to the second actuator motor 321, a bottom connecting to the second end portion 12, and a second active portion 324 corresponding to the second pushing axis 323. The second active portion 324 connects to the second actuator motor 321 by a second coil spring 325 sheathing around the second pushing axis 323. The structure and the operations of the second elastic-pushing component 322 are very similar to that of the first elastic-pushing component 312, and thus the corresponding descriptions are omitted hereinafter.

When the first elastic-pushing component 312 and the second elastic-pushing component 322 are driven respectively by the first elastic-pushing component 312 and the second elastic-pushing component 322 to move toward the folded housing 20 or to move toward a center of the folded housing 20, the state of the flexible display panel may be rapidly changed due to the forces generated by the above operations.

The first end portion 11 and the second end portion 12 respectively connects to free ends of the first elastic-pushing component 312 and second elastic-pushing component 322 by dual-sided adhesive (not shown).

To protect the first actuator 31 and the second actuator 32, the folded housing 20 further includes a first bottom cover 24 and a second bottom cover 25. The bottom cover 24 engages with the first wing portion 21 to clasp the first actuator 31 between the first bottom cover 24 and the first wing portion 21. Similarly, the second bottom cover 25 engages with the second wing portion 22 to clasp the second actuator 32 between the second bottom cover 25 and the second wing portion 22.

When the folded housing 20 transits from other states, such as a folded state, into a flat state, the flexible display panel 10 on the curved carrier surface (10B) may not be able to recover to a fully flat state quickly due to being folded by long curvature and long time period. In particular, the portion corresponding to the hinge component 23 may include a wave-shaped bulge, as shown in FIG. 2. The first actuator 31 and the second actuator 32 apply forces toward the first end portion 11 and the second end portion 12 to cause the flexible display panel 10 to stretch the flexible display panel 10 along a long-axis direction until the flexible display panel 10 fully cover the folded housing 20.

However, with the above mechanical structure, it's still difficult to control the forces applied toward the first end portion 11 and the second end portion 12. For example, if the forces are not enough, the flexible display panel may not be fully flat. If the forces are too huge, the flexible display panel remains in a stretching state.

Figure 4:
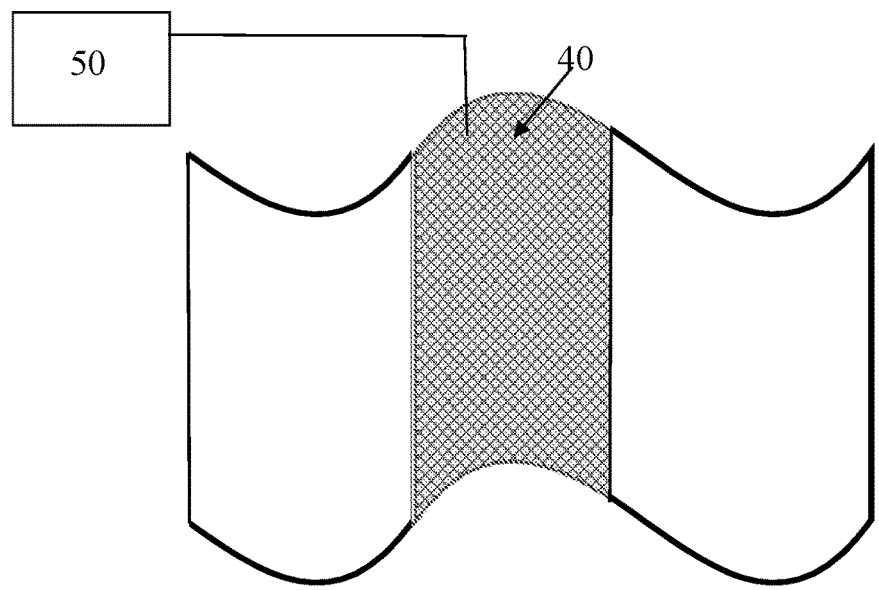
FIG. 4 is a partial view of the flexible display panel in accordance with one embodiment of the present disclosure.

The present disclosure also relates to a force sensing system for detecting a state of the flexible display panel. Referring to FIG. 4, the force sensing system includes at least one force sensor 40 and a controller 50. The force sensor 40 is configured in a bending area of the flexible display panel 10, such as a middle portion of the flexible display panel 10 corresponding to the hinge component 23. As such, the force sensor 40 is capable of detecting the deformed state of the flexible display panel 10 and also the corresponding stresses.

The bending area of the flexible display panel relates to the area being folded most frequently. The force sensor may be formed on the flexible substrate, or may be formed when the driving array of the display panel is formed.

The controller 50 of the display device connects to the flexible display panel. To enhance the force sensor 40, the controller 50 also connects to the force sensor 40. That is, the controller 50 drives the force sensor 40.

Figure 5:
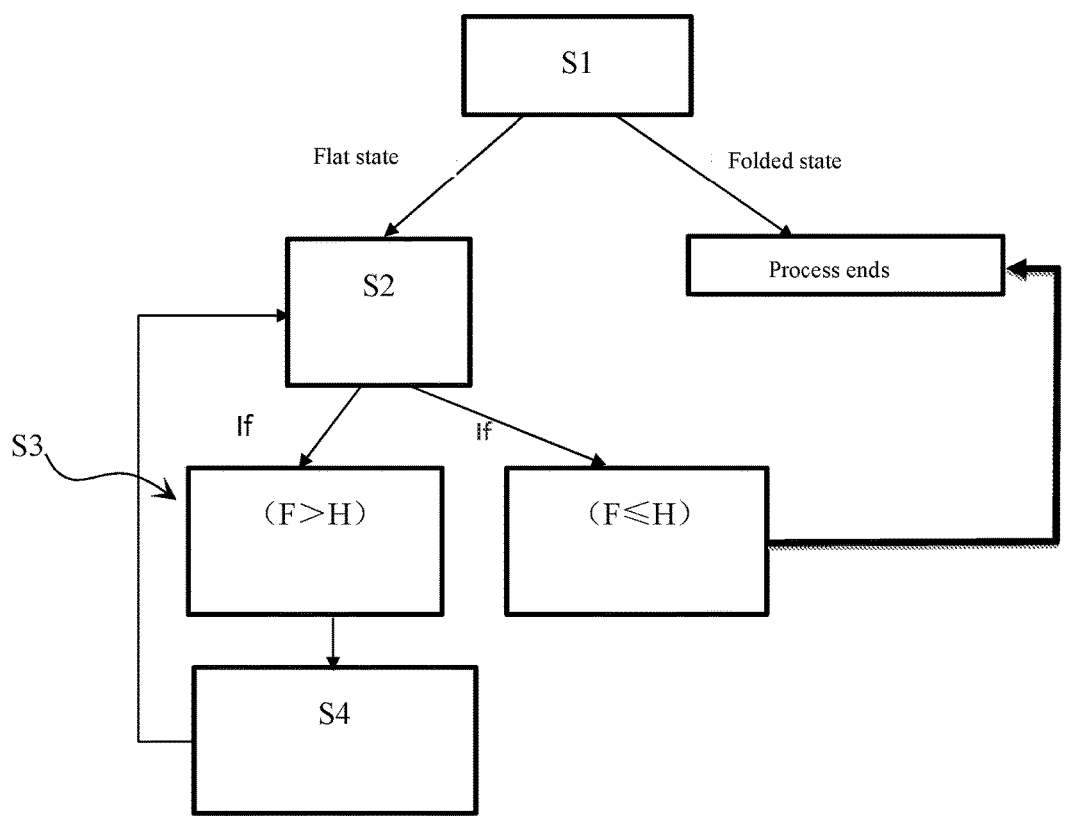
FIG. 5 is a flowchart of the flexible display device in accordance with one embodiment of the present disclosure.

The operations of the display device will be described hereinafter. Referring to FIG. 5, when the state of the folded housing 20 changes, i.e., transiting from a folding state to a flat state, in step S1, the controller 50 is activated. In step S2, the controller 50 drives the force sensor 40 to detect a force (F) applied to the flexible display panel 10, and the controller 50 receives force information feedback from the force sensor 40. In step S3, the controller 50 compares the force information with a predetermined force value (H) configured within the controller 50 in advance. If the detected force (F) is not greater than the predetermined force value (H), it is determined that the flexible display panel is in a flat state or a folded degree of the flexible display panel is acceptable. If the detected force (F) is greater than the predetermined force value (H) (F>H), it is determined that the flexible display panel is in a folded state, and the controller 50 calculates a traction force value (F') for stretching the flexible display panel completely. In step S4, transmitting the traction force value (F') to the first actuator 31 and the second actuator 32 to activate the first actuator 31 and the second actuator 32. The flexible display panel is stretched out toward two ends until being stretched completely.

Preferably, during the stretching process of the first actuator 31 and the second actuator 32, the force information has been updated continuously by the force sensor 40, and the step S2-S4 are conducted repeatedly. The traction force values (F') applied by the first actuator 31 and the second actuator 32 are enhanced continuously until the flexible display panel is completely flat.

The force sensor 40 may be configured in the bending area of the flexible display panel, or may be configured in the location of the housing corresponding to the bending area, such as on the hinge.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device, comprising:
    a flexible display panel, a folded housing carrying the flexible display panel, and a force sensing system configured in a bending area of the flexible display panel, the bending area of the flexible display panel being bent frequently, and the force sensing system being configured for detecting a deformed state of the flexible display panel;
    the folded housing comprising a first wing portion, a second wing portion, a hinge component connecting between the first wing portion and the second wing portion, a first actuator and a second actuator arranged below the first wing portion and the second wing portion, and the first actuator and the second actuator are mirror-symmetrical;
    the flexible display panel protruding from the first wing portion and the second wing portion, and the flexible display panel connecting to the first actuator and the second actuator, the first actuator and the second actuator configured to apply traction forces to the first end portion and the second portion according to force information detected by the force sensing system, such that the flexible display panel being completely bonded on a surface of the folded housing.

2. The display device as claimed in claim 1, wherein the first wing portion, the second wing portion, and the hinge component are on the same plane, and the folded housing comprises at least a flat state.

3. The display device as claimed in claim 2, wherein the force sensing system comprises a force sensor and a controller, the controller respectively connects to the first actuator, the second actuator, and the force sensor; the controller drives the force sensor to detect and to receive the force information, and the controller calculates a value of the traction forces according to the force information to activate the first actuator and the second actuator, such that the flexible display panel being completely bonded on a surface of the folded housing.

4. The display device as claimed in claim 1, wherein the first wing portion and the second wing portion rotate with respect to the hinge component, and a diagonal angle formed by the first wing portion and the second wing portion is in a range from 0 to 360 degrees.

5. The display device as claimed in claim 1, wherein the first actuator comprises a first actuator motor and a first elastic-pushing component connecting with the first actuator motor, the second actuator comprises a second actuator motor and second first elastic-pushing component connecting with the second actuator motor, the first end portion and the second end portion respectively connects to free ends of the first elastic-pushing component and second elastic-pushing component.

6. The display device as claimed in claim 5, wherein the first end portion and the second end portion respectively connects to the free ends of the first elastic-pushing component and second elastic-pushing component via dual-sided adhesive.

7. The display device as claimed in claim 1, wherein the folded housing further comprises a first bottom cover and a second bottom cover, the first bottom cover engages with the first wing portion to clasp the first actuator between the first bottom cover and the first wing portion, the second bottom cover engages with the second wing portion to clasp the second actuator between the second bottom cover and the second wing portion.

8. A flatting method of the flexible display panels as claimed in claim 3, wherein the method further comprises:
   in step S1, activating the controller;
   in step S2, driving the force sensor by the controller to detect a force (F) applied to the flexible display panel, and receiving the force information feedback by the force sensor;
   in step S3, comparing the force indicated by the force information with a predetermined force value configured within the controller in advance;
   stopping operations of the controller upon determining that the detected force (F) is not greater than the predetermined force value (H) (F≤H)
   calculating a traction force value (F') for stretching the flexible display panel completely upon determining that the detected force (F) is greater than the predetermined force value (H) (F>H);
   in step S4, transmitting the traction force value (F') to the first actuator and the second actuator to activate the first actuator and the second actuator, and applying the traction force value (F') to the flexible display panel by the first actuator and the second actuator such that the flexible display panel being stretched completely.

* * * * *